(12) United States Patent
Ostermeier et al.

(10) Patent No.: US 6,612,588 B2
(45) Date of Patent: Sep. 2, 2003

(54) TORQUE-TRANSMITTING ARRANGEMENT

(75) Inventors: Peter Ostermeier, Diessen (DE); Wolfgang Erdt, Martinsried (DE); Peter Ehe, Röns (AT); Marcus Flock, Tholey (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 10/005,665

(22) Filed: Nov. 2, 2001

(65) Prior Publication Data
US 2002/0063400 A1 May 30, 2002

(30) Foreign Application Priority Data
Nov. 25, 2000 (DE) .......................... 100 58 587

(51) Int. Cl.[7] ................................. B25G 3/02
(52) U.S. Cl. ..................... 279/89; 279/78; 279/904
(58) Field of Search ............... 279/77, 78, 82, 279/904, 89; 408/239 R; 125/20; 464/185, 901; 403/315, 317, 322.1, 359.1, 359.5, 359.6, DIG. 4

(56) References Cited

U.S. PATENT DOCUMENTS

| | | | |
|---|---|---|---|
| 2,337,400 A | * 12/1943 | Maute ....................... | 279/77 X |
| 3,622,169 A | * 11/1971 | Koch et al. ................ | 279/89 X |
| 4,701,083 A | * 10/1987 | Deutschenbaur et al. . | 279/82 X |
| 5,011,346 A | * 4/1991 | Pfalzgraf ................... | 408/239 R |
| 5,118,231 A | * 6/1992 | Daniels ..................... | 408/239 R |
| 5,286,145 A | * 2/1994 | Kleine ...................... | 408/239 R |
| 5,558,478 A | * 9/1996 | Odendahl et al. ......... | 279/82 X |
| 5,921,563 A | * 7/1999 | Huggins et al. .......... | 279/904 X |
| 6,390,739 B1 | * 5/2002 | O'Banion ................. | 279/904 X |
| 2002/0122702 A1 | * 9/2002 | DeBlasio .................. | 408/239 R |

FOREIGN PATENT DOCUMENTS

DE     3434076     4/1986

* cited by examiner

Primary Examiner—Greg Binda
(74) Attorney, Agent, or Firm—Sidley Austin Brown & Wood, LLP

(57) ABSTRACT

An arrangement for transmitting a torque from a power tool to a working tool and including a shank forming part of the working tool and having following one another, in the operational direction of the working tool, first, second, third, and fourth regions (B1, B2, B3, B4), at least two drive grooves (3) extending parallel to a working tool axis over all of the shank regions (B1, B2, B3, B4), and at least one additional drive groove (4) extending in third and fourth regions (B3, B4) of the shank (2), with the arrangement further including a chuck (10) having an opening (13) for receiving the shank (2), at least one locking element (21) projecting into the receiving groove (13) for engagement into the circumferential groove (5) of the shank (2), at least two drive dogs (16) and an additional drive dog projecting into the receiving groove (13) for engagement in the first drive grooves (3) and the at least one additional drive groove (4).

10 Claims, 2 Drawing Sheets

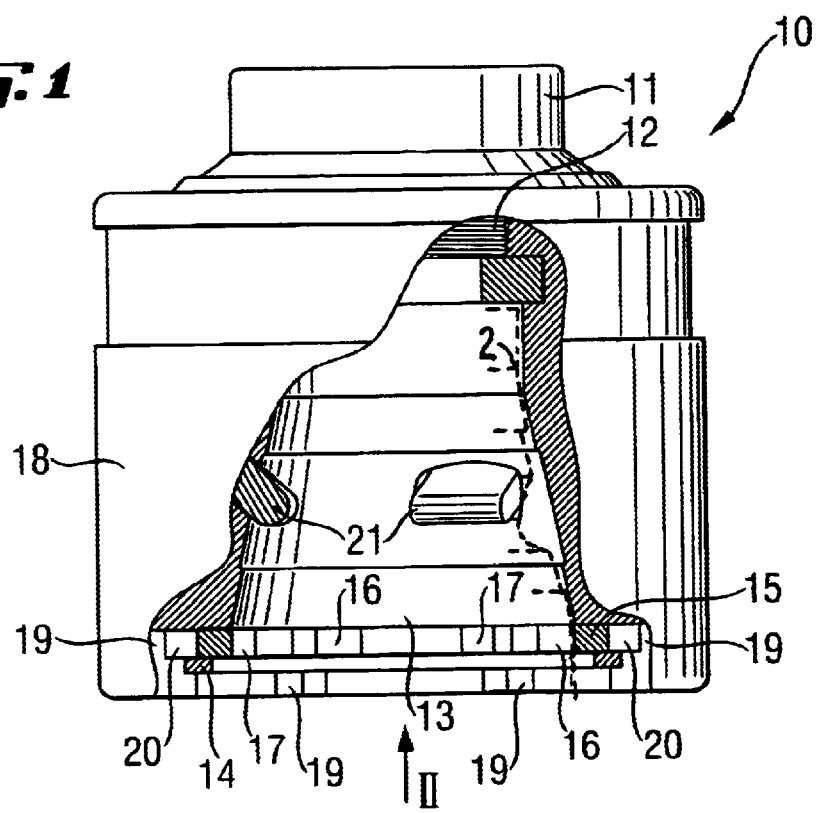
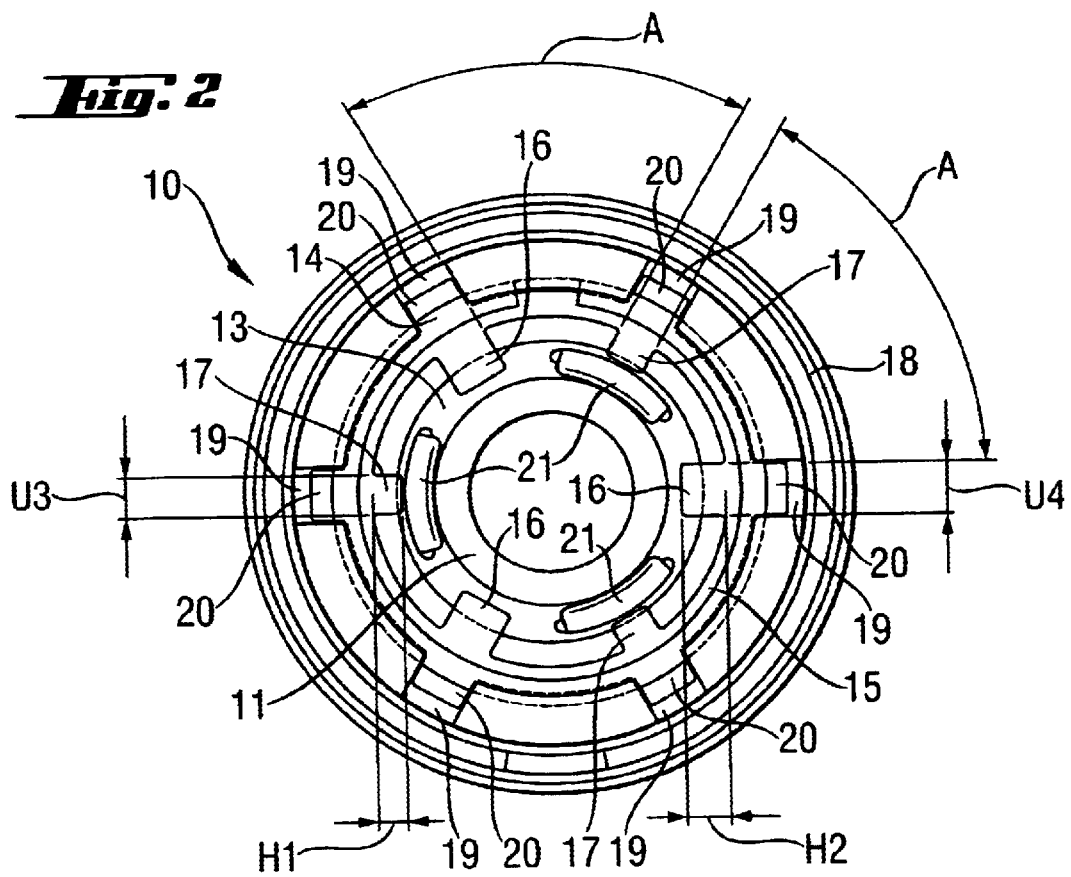

TORQUE-TRANSMITTING ARRANGEMENT

BACKGROUND OF THE INVENTION

1. Field of the Invention

The present invention relates to an arrangement for transmitting a torque from a power tool to a working tool releasably connectable with the power tool and including a shank forming part of the working tool and a chuck for receiving the shank and forming part of the power tool, with the shank and the chuck having cooperating elements which provide for joint rotation of the chuck and the shank.

2. Description of the Prior Art

For forming bores in hard constructional components formed of concrete, stone, or the like, working tools with a tubular support, which is provided at its free end with a plurality of cutting elements, are used. The working tool is releasably connected with a power tool and is rotated by the power tool drive. For transmitting the torque to the working tool, an arrangement, which is formed of the working tool shank and a chuck provided on the power tool, is used. Such an arrangement is disclosed, e.g., in German Publication DE-34 34 076.

In DE-34 34 076, the shank is provided at an end of a tubular support opposite to the free end of the tubular support provided with cutting segments. In DE-34 34 076, the shank has a first region conically widening in an operational direction of the working tool, a second region adjoining the first region facing in the operational direction, the second region having a circumferential groove, a third region adjoining the second region at an end of the second region facing in the operational direction, a fourth cylindrical region adjoining the third region at an end of the third region facing in the operational direction, and at least two drive grooves extending parallel to a working tool axis over all of the shank regions.

The chuck of DE-34 34 076 has an opening conically widening in the operational direction of the working tool for receiving the shank, two locking elements projecting into the receiving groove for engagement into the circumferential groove of the chuck, and at least two drive dogs projecting into the receiving groove for engagement in the drive grooves of the shank. The locking elements are displaceable substantially radially by a locking sleeve displaceable parallel to the operational direction.

Upon insertion of the working tool shank in the chuck, centering of the shank in the chuck and a tight clamping of the shank in the chuck take place as a result of cooperation of conical regions of the shank with respective regions of the chuck. The locking elements, which engage in the circumferential groove formed in the shank upon the insertion of the shank in the chuck, prevent axial displacement of the shank in the receiving opening of the chuck. The transmission of the torque is effected with the drive dogs which formlockingly engage in the drive grooves provided in the shank.

When a very high torque is being transmitted, the surface pressure between the drive dogs and the drive grooves becomes very high, which can result in the damage of the drive dog flanks associated with respective surfaces of the drive grooves of the shank.

Accordingly, an object of the present invention is to provide an arrangement with which very high torques can be transmitted without any or a minimal damage of the torque-transmitting elements, while insuring that guiding, centering, clamping, and sealing functions, in the area of a contact of the first shank region with the respective chuck region, are maintained.

SUMMARY OF THE INVENTION

This and other objects of the present invention, which will become apparent hereinafter, are achieved by providing at least one additional drive groove in the shank, which extends in the third and fourth regions of the shank, and by providing, in the chuck, at least one additional drive dog projecting into the chuck receiving opening for engagement in at least one additional drive groove which is formed in the shank.

The additional drive groove according to the present invention is provided in that region of the shank where, because of a large diameter of the respective section of the shank, large torques can be transmitted particularly well. The additional drive groove, which is provided in addition to drive grooves, increases the engagement surface designated for receiving the torque. The increase of the torque-receiving engagement surface of the shank results in reduction of the surface pressure. The reduction of the surface pressure eliminates or substantially reduces the danger of the drive grooves or the drive dogs being damaged. Because the additional drive groove is located only in the third and fourth shank regions, the contact surface, which is available in the first, conical region of the shank remains unchanged and, in cooperation with respective surface of the chuck, provides for necessary guidance, centering, clamping, and sealing.

Preferably, the number of additional drive grooves corresponds to the number of drive grooves, with each additional drive groove being located between two drive grooves. With an increased number of all of the drive grooves, an entire torque-receiving engagement surface of the shank is increased which results in decreasing of the surface pressure.

A uniform distribution of an acting on the shank, torque over the circumference of the shank is advantageously achieved by providing three drive grooves uniformly distributed over the shank circumference, and three additional drive grooves likewise uniformly distributed over the shank circumference, with each additional drive groove being arranged between respective two drive grooves.

For quick insertion of the working tool shank into the chuck without spending much time for aligning the drive grooves and the additional drive grooves with respective drive dogs, advantageously each additional drive groove is equidistantly spaced from the adjacent drive grooves. E.g., with three drive grooves and three additional drive grooves, the grooves are arranged relative to each other at angle of 60°.

To make the torque-receiving engagement surface of the shank as large as possible, the circumferential extent of each additional drive groove is so selected that it corresponds to 0.3–0.8 of the circumferential extent of the drive groove. The radial depth of each additional drive groove is so selected that it corresponds to 0.3–0.6 of the radial depth of a drive groove.

In the transition region between the shank and the tubular support, there is provided a flange-shaped widening the outer diameter of which corresponds to the outer diameter of the tubular support.

Under certain conditions, when the additional drive grooves also perform an encoding function, it is advantageous when the angles between adjacent drive grooves, and/or their radial depths, and/or their circumferential extents differ from each other. The presence of the encoding function permits to associate, e.g., working tools having different diameters with power tools having different powers. E.g., a working tool having a small diameter can only be used with or be inserted into a power tool with a small driving power.

For a uniform distribution of the transmittable torque over the entire circumference of the working tool shank, the chuck advantageously has a number of additional drive dogs corresponding to the number of drive dogs, with each additional drive dog being located between two adjacent drive dogs.

For quick insertion of the working tool shank into the chuck without spending much time for aligning the shank with the chuck, advantageously, each additional drive dog is equidistantly spaced from adjacent drive dogs. As a result of the uniform distribution of the drive dogs, the shank can be inserted by being pivoted only by a small angle until the drive dogs engage in the drive grooves, and the additional drive dogs engage in the additional drive groove.

In order for the chuck to be able to transmit a torque as large as possible, the circumferential extent of each additional drive dog is so selected that it corresponds to 0.3–0.8 of the circumferential extend of the drive dog, and the radial height of each additional drive dog is so selected that it corresponds to 0.3–0.6 of the radial height of the drive dogs.

The length of the additional drive dog substantially corresponds to the length of the additional drive groove.

The novel features of the present invention, which are considered as characteristic for the invention, are set forth in the appended claims. The invention itself, however, both as to its construction and its mode of operation, together with additional advantages and objects thereof, will be best understood from the following detailed description of the preferred embodiment, when read with reference to the accompanying drawings.

BRIEF DESCRIPTION OF THE DRAWINGS

The drawings show:

FIG. 1 a perspective, partially cross-sectional view of a torque-transmitting arrangement according to the present invention;

FIG. 2 a view in a direction of arrow II in FIG. 1;

DETAILED DESCRIPTION OF THE PREFERRED EMBODIMENT

Figure 3:
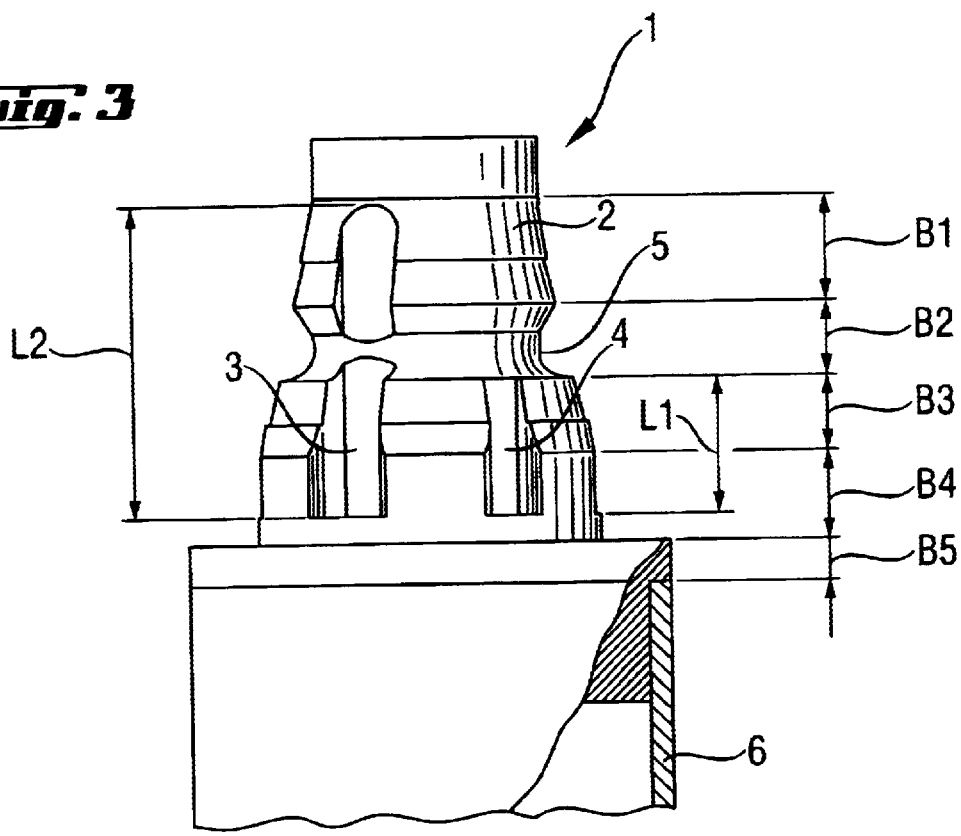
FIG. 3 a side partially cross-sectional view of a working tool according to the present invention.
Figure 4:
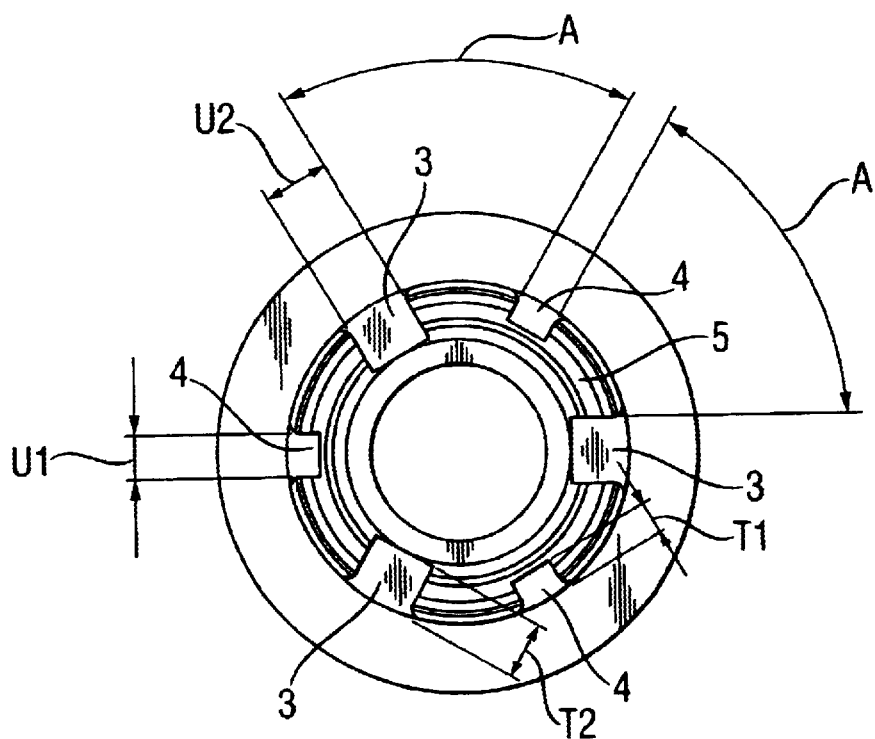
FIG. 4 a plan view of a shank of the working tool shown in FIG. 3.

A chuck 10, which is shown in FIGS. 1–2, and a shank 2, which is shown in FIGS. 3–4, of a working tool 1, form, together, an arrangement for transmitting a rotational movement from a drive, which is shown only partially, to a working tool 1 releasably connectable with the drive. A position of the shank 2 in the chuck 10 is shown in FIG. 1 with dash lines.

The chuck 10 includes a base member 11 with a central bore provided with an inner thread 12. The thread 12 is provided in the end region of the base member 11, which faces in the direction opposite to the operational direction of the working tool 1, and serves for connecting the chuck 10 with the drive shaft of the drive.

The end region or section of the base member facing in the operational direction of the working tool 1 conically widens in the operational direction and forms an opening 13 for receiving and guiding the shank 2 of the working tool 1. A drive region is formed between the mouth of the receiving opening 13, which faces in the operational direction of the working tool 1, and an end of a base member 11 facing in the same direction. The drive region serves for fixedly receiving a drive disc 15. The drive region has a plurality of indentations 19 uniformly distributed over the circumference of the largest inner diameter of the receiving opening 13. The indentations 19 are open in the operational direction of the working tool 1 at the end surface of the chuck 10. Each of the indentation 19 serves for receiving one of a plurality of driving tongues 20 of the drive disc 15. A locking ring 14 serves for securing the drive disc 15 on the chuck 10. The locking ring 14 is located in a circumferential undercut provided on the inner profile of the drive region. The distance, by which the undercut is spaced, parallel to the operational direction, from the mouth of the receiving opening 13, corresponds at least to the thickness of the drive disc 15.

The base member 11 is surrounded by a locking sleeve 18 displaceable relative to the base member 11 parallel to the operating direction of the working tool. In the region of the receiving opening 13, the chuck 10 has three, substantially radially displaceable locking elements 21 which cooperate with the locking sleeve 18. The locking elements 21 are uniformly distributed over the circumference of the base member 11. The locking sleeve 18 pivotally displace the locking elements 21 from their initial position, in which they do not project into the opening 13, into a locking position in which they project into the opening 13. In their locking position, the locking elements 21 formlockingly or positively cooperate with a circumferential groove 5 which is provided on the shank 2.

The working tool 1, which is shown in FIGS. 3–4, is formed of the shank 2 and a tubular support 6 with a plurality of cuffing elements (not shown) provided at the free, facing in the operational direction, end of the support 6. The shank 2 has a first region B1, which conically widens in the operational direction and which is adjoined, in the operational direction, by a second region B2 provided with the circumferential groove 5. The second region B2 is adjoined, in the operational direction, by a third region B3 that also widens in the operational direction. The shank 2 ends, in the operational direction, with a cylindrical region B4. The shank 2 has three, extending in the direction of the working tool axis, first drive grooves 3 that extend along all of the four shank regions B1, B2, B3, B4. As it has been discussed previously, the locking elements 21, which are provided in the chuck 10, engage in the circumferential recess 5 when the shank 2 is received in the receiving opening 13 of the chuck 10.

In addition to the three first drive grooves 3, the shank 2 has three additional or second drive grooves 4 uniformly distributed over the shank circumference and having their respective sides spaced from respective adjacent sides of the first drive groove 3 by an angular distance A. The first drive groove 3 have a length L2 that is greater than a length L1 of the second drive groove 4. The second drive grooves 4 extend only over the regions B3 and B4 having a diameter at least equal to the largest diameter of the conical region B3. There is further provided an intermediate flange-like region B5 that adjoins, in the operational direction, the region B4. The region B5 is directly connected with the tubular support 6 of working tool 1. The diameter of the flange-like region B5 substantially corresponds to the diameter of the tubular support 6.

The cross-sections of the first and second grooves 3 and 4 transverse to the operational directions are different in size. The radial depth T2 of the first drive grooves 3 is larger than the radial depth T1 of the second drive grooves 4, with the depth T1 of the second drive 4 groove corresponding to 0.3–0.6 of the depth T2 of the first drive groove 3. The circumferential extent U2 of the first drive grooves 3 is larger than the circumferential extent U1 of the second drive grooves 4, with the circumferential extent U1 corresponding to 0.3–0.8 of the circumferential extent U2. The drive disc 15, which is located in the drive region of the chuck 10, has a plurality of first drive dogs 16 having a height H2 and a circumferential extent U4 corresponding to respective dimensions U2 and T2 of the first drive grooves 3, and a plurality of additional or second drive dogs 17 having a height H1 and a circumferential extent U3 corresponding to respective dimensions T1 and U1 of the second drive grooves 4. The first and second drive dogs 16 and 17 project into the axial projection surface of the receiving opening 13 in the chuck 10 for engaging in respective first and second drive grooves 3 and 4 to provide for joint rotation of the chuck 10 and the shank 2. The circumferential extent U3 of the second drive dogs 17 corresponds to 0.3–0.8 of the extent U4 of the first drive dogs 16. The radial height H1 of the second drive dogs 17 corresponds to 0.3–0.6 of the radial height H2 of the first drive dogs 16.

Though the present invention was shown and described with references to the preferred embodiment, such are merely illustrative of the present invention and are not to be construed as a limitation thereof, and various modifications of the present invention will be apparent to those skilled in the art. It is, therefore, not intended that the present invention be limited to the disclosed embodiment or details thereof, and the present invention includes all variations and/or alternative embodiments within the spirit and scope of the present invention as defined by the appended claims.

What is claimed is:

1. An arrangement for transmitting a torque from a power tool to a working tool releasably connectable with the power tool, comprising:

a shank (2) forming part of the working tool (1) and having a first region (B1) conically widening in an operational direction of the working tool (1), a second region (B2) adjoining the first region at an end of the first region (B1) facing in the operational direction, the second region (B2) having a circumferential groove (5), a third region (B3) adjoining the second region (B2) at an end of the second region (B2) facing in the operational direction, a fourth, cylindrical region (B4) adjoining the third region (B3) in the operational direction, at least two first drive grooves (3) extending parallel to a working tool axis over all of the shank regions (B1, B2, B3, B4), and at least one second drive groove (4) extending in third and fourth regions (B3, B4) of the shank (2); and a chuck (10) having an opening (13) conically widening in the operational direction of the working tool (1) for receiving the shank (2), at least one locking element (21) projecting into the receiving opening (13) of the chuck (10) for engaging the circumferential groove (5) of the chuck (2), at least two first drive dogs (16) projecting into the receiving opening (13) for engaging in at least two first drive grooves (3) of the shank (2) to provide for joint rotation of the shank (2) and the chuck (10), and at least one second drive dog (17) projecting into the receiving opening (13) for engaging in the at least one second drive groove (4) of the shank (2).

2. An arrangement according to claim 1, where in a number of second drive grooves (4) correspond to a number of the first drive grooves (3), with each second drive groove (4) being located between two first drive grooves (3).

3. An arrangement according to claim 2, wherein each of the second drive grooves (4) has a circumferential extent (U1) corresponding to 0.3–0.8 of a circumferential extent (U2) of a first drive groove (3).

4. An arrangement according to claim 2, wherein each of the second drive grooves (4) has a radial depth (T1) corresponding to 0.3–0.6 of a radial depth (T2) of a first drive groove (3).

5. An arrangement according to claim 2, wherein the chuck (10) comprises a number of second drive dogs (17) corresponding to the number of the second drive grooves (4), with each second drive dog (17) being located between two first drive dogs (16).

6. An arrangement according to claim 1, wherein the shank (2) has three first drive grooves (3).

7. An arrangement according to claim 1, wherein the at least one second drive groove (4) is equidistantly spaced from at least two first drive grooves (3).

8. An arrangement according to claim 1, wherein each second drive dog (17) is equidistantly spaced from the adjacent first drive dogs (16).

9. An arrangement according to claim 8, wherein each of the second drive dogs (17) has a circumferential extent (U3) corresponding to 0.3–0.8 of a circumferential extent (U4) of a first drive dog (16).

10. An arrangement according to claim 8, wherein each second drive dog (17) has a radial height (H1) corresponding to 0.3–0.6 of a radial height (U2) of the first drive dog (16).

* * * * *